United States Patent
Puppe et al.

(10) Patent No.: US 8,299,131 B2
(45) Date of Patent: Oct. 30, 2012

(54) SILICA GEL COMPRISING GUANIDINE CARBONATE

(75) Inventors: Lothar Puppe, Burscheid (DE); Dietrich Pantke, Ratingen (DE)

(73) Assignee: Akzo Nobel Chemicals International B.V. (NL)

( * ) Notice: Subject to any disclaimer, the term of this patent is extended or adjusted under 35 U.S.C. 154(b) by 202 days.

(21) Appl. No.: 10/520,574

(22) PCT Filed: Jul. 7, 2003

(86) PCT No.: PCT/EP03/07235
§ 371 (c)(1), (2), (4) Date: Jul. 15, 2005

(87) PCT Pub. No.: WO2004/007367
PCT Pub. Date: Jan. 22, 2004

(65) Prior Publication Data
US 2006/0013754 A1    Jan. 19, 2006

(30) Foreign Application Priority Data
Jul. 10, 2002 (DE) ................................. 102 30 982

(51) Int. Cl.
*C01B 33/12* (2006.01)
*C01B 33/141* (2006.01)

(52) U.S. Cl. ........................................ 516/83; 423/338
(58) Field of Classification Search .................. 423/338
See application file for complete search history.

(56) References Cited

U.S. PATENT DOCUMENTS

| | | | |
|---|---|---|---|
| 2,224,325 A | | 12/1940 | Wagner |
| 3,012,973 A | * | 12/1961 | Atkins .................. 516/84 |
| 3,468,813 A | | 9/1969 | Mindick et al. |
| 3,475,375 A | * | 10/1969 | Yates .................. 525/472 |
| 3,597,248 A | * | 8/1971 | Yates .................. 501/55 |
| 3,630,954 A | * | 12/1971 | Yates .................. 516/83 |
| 3,655,578 A | * | 4/1972 | Yates .................. 516/83 |
| 3,894,572 A | * | 7/1975 | Moore, Jr. .......... 164/516 |
| 5,192,351 A | * | 3/1993 | Mathur et al. ......... 65/17.2 |
| 5,221,497 A | * | 6/1993 | Watanabe et al. ...... 516/83 |

(Continued)

FOREIGN PATENT DOCUMENTS
CN    1052770 C    5/2000
(Continued)

OTHER PUBLICATIONS
The Chemistry of Silica, (month unavailable) 1978, pp. 407-410, Ralph K. Iler, "Sols of Silica Particles With Modified Surfaces".
(Continued)

*Primary Examiner* — Karl J Puttlitz
(74) *Attorney, Agent, or Firm* — Connolly Bove Lodge & Hutz LLP

(57) ABSTRACT

A process of preparing a silica sol is described. The process involves reacting a fresh sol with guanidine carbonate. The reaction may be conducted in the presence of a base (e. g., sodium water glass), and at a pH of from 8 to 12. The process of the present invention may also include concentrating steps. The silica sol prepared by the method of the present invention has a BET surface area of greater than or equal to 100 $m^2/g$, and contains from 0.05 to 15% by weight of gaunidinium ions, based on the total weight of the silica gel.

13 Claims, 3 Drawing Sheets

U.S. PATENT DOCUMENTS

| | | | |
|---|---|---|---|
| 5,368,833 A | | 11/1994 | Johansson et al. |
| 5,603,805 A | * | 2/1997 | Andersson et al. ......... 162/168.3 |
| 5,643,414 A | * | 7/1997 | Johansson et al. ......... 162/164.6 |
| 5,964,693 A | * | 10/1999 | Brekau et al. ................ 516/82 |
| 6,310,104 B1 | * | 10/2001 | Keiser et al. .................... 516/79 |
| 2003/0157804 A1 | | 8/2003 | Puppe et al. |

FOREIGN PATENT DOCUMENTS

| | | | |
|---|---|---|---|
| EP | 0464289 | | 1/1992 |
| GB | 1202303 | * | 8/1970 |
| JP | 58110417 A | | 7/1983 |
| JP | 04074707 A | | 3/1992 |
| JP | 4231319 A | | 8/1992 |
| JP | 8502016 | | 3/1996 |
| JP | 10036843 A | | 2/1998 |
| JP | 2002145609 A | | 5/2002 |
| JP | 2003224092 A | | 8/2003 |
| RU | 2072195 | | 1/1997 |
| WO | WO-94/05596 | | 3/1994 |
| WO | WO-01/46072 A1 | | 6/2001 |

OTHER PUBLICATIONS

Brunauer, et al., "Adsorption of Gases in Multimolecular Layers," *Adsorption of Gases in Multimolecular Layers*, Feb. 1938, pp. 309-319.

Iler, et al "Degree of Hydration of Particles of Colloidal Silica in Aqueous Solution," *Hydration of Colloidal Silica Particles in Aqueous Solution*, Jul. 1956, pp. 955-957.

Sears, "Determination of Specific Surface Area of Colloidal Silica by Titration with Sodium Hydroxide," *Analytical Chemistry*, Dec. 1956, vol. 28, No. 12, pp. 1981-1983.

Din 55 350, Teil 13, Jul. 1987, pp. 1-8, "Begriffe zur Gernauigkelt von Ermittlungsverfahren und Ermittlungsergebnissen."

Weiner et al., "Zeta potential—A New Approach," Brookhaven Instruments Germany, Sep. 8-12, 1993.

Weiner et al., Zeta Potential: A New Approach, Canadian Mineral Analysts Meeting, Winnipeg, MB, Canada, Sep. 8-12, 1993.

* cited by examiner

200000 : 1

200 nm

SILICA GEL COMPRISING GUANIDINE CARBONATE

FIELD OF THE INVENTION

The present invention relates to guanidinium ion-containing silica sol, a process for its preparation and concentration and its use, for example in paper retention.

BACKGROUND OF THE INVENTION

Silica sols are sedimentation-stable, colloidal solutions of amorphous $SiO_2$ in water or alcohols and other polar solvents. They generally have the flowability of water, and some of the commercial products available to date have high solids concentrations of up to 60% by weight of $SiO_2$.

Silica sols have a variety of uses. For example, they are suitable for use as binders for precision casting, for fibers in the refractories sector and in the preparation of catalysts, as coating agents for films (antiblocking) or silicon steel sheets, in the textile sector for antislip finishes, in the construction sector as additives for air-placed concrete or as binders for fireproofing and heatproofing applications, as polishes for electronics or in the paper sector, for example in paper retention or as an additive in the coating of special papers.

Conventional silica sols are milky opaque through opalescent to colorless and clear, depending on the particle size of the silica particles. The particles of the silica sols have diameters of from 3 nm to 50 nm, preferably from 5 nm to 150 nm. The particles are as a rule spherical and localized and preferably have a negative electrical charge. A framework of siloxane bonds which arises from the linkage of $[SiO_4]$ tetrahedra or of polysilicic acids is usually present in the interior of the individual particles. Frequently, SiOH groups are arranged on the surface. Stable silica sols having specific surface areas of from about 30 to 1200 $m^2/g$ are preferred for various applications.

The stability of the silica sols is very important. Particularly silica sols which contain very fine $SiO_2$ particles, i.e. silica sols having a large specific surface area, tend to gel formation, so that stabilization is often necessary. Conventional methods for stabilizing silica sols are treatment with alkali metal hydroxides or modification of the surface with aluminum.

U.S. Pat. No. 5,643,414 describes a colloidal finely divided silica sol which has a large BET surface area of greater than 500 $m^2/g$ and is stabilized by treatment of the surface with aluminum ions. Furthermore, U.S. Pat. No. 5,603,805 describes an aluminum-stabilized silica sol, which however has a surface area of less than 700 $m^2/g$.

U.S. Pat. No. 6,310,104 B1 describes a finely divided, colloidal borosilicate. According to U.S. Pat. No. 6,310,104 B1, such a colloidal borosilicate is superior to silica sols when used as a paper retention aid.

Common to all these stabilized materials is that they have Si—O—Al linkages or Si—O—B linkages on the surface for stabilization.

U.S. Pat. No. 5,221,497 furthermore discloses silica sols which have so-called structured or partly agglomerated particles. These structured particles consist of small particles which are combined to form chain-like or three-dimensional formations so that the particles have an elongated structure. The individual particles are arranged in each case in a plane so that two-dimensional structures are formed. The presence of an alkali metal oxide is necessary for stabilization. These silica sols are proposed for use in paper retention.

In U.S. Pat. No. 3,630,954, inter alia, a guanidine silicate is used as a raw material for the preparation of fresh sol. According to example 8, a solution of amorphous guanidine silicate is first prepared for this purpose by reacting guanidine hydroxide and silica sol. Said amorphous guanidine silicate is then deionized by means of a dimethylamine-sulfonic acid cation exchanger. In this step, the major part of the guanidinium ions is removed and a dimethylamine-containing silica sol forms, the molar ratio of $SiO_2$ to guanidine oxide being 7.5:1 and the amount of dimethylamine being 1 mol. The surface area, determined by means of base titration according to Sears, is 1500 $m^2/g$. As a result of its preparation, the sol contains large amounts of dimethylamine.

In the preparation of silica sol, in general a fresh sol is first prepared. This is an alkali-free $SiO_2$ solution which is produced, for example, by removing alkali metal cations from a water glass. The resulting fresh sol is very unstable and is therefore immediately stabilized by rendering it alkaline again and by growing on silica sol particles present and by simultaneous thermal treatment in between or afterward. In order to obtain silica sols having a desired content of $SiO_2$, a process for concentrating the aqueous solution can follow. The concentration can be effected, for example, thermally by evaporating down or by ultrafiltration through membranes. Ceramic membranes are suitable for this purpose. Often, the silica sol is stabilized by rendering the solution alkaline to an $SiO_2:Na_2O$ molar ratio of from 40 to 130:1, heating a part of the solution to 60 to 100° C. for increasing the particle size and then continuously adding the remaining fresh sol solution and allowing it to grow on the particles already present. Simultaneously or thereafter, concentration of the solution to the desired concentration can be carried out by evaporating down. However, a finely divided silica sol rendered alkaline only by means of inorganic bases has the disadvantage that the BET surface area does not remain stable. Such silica sols are therefore generally stabilized with aluminum ions (K. K. Iler, The Chemistry of Silica, Wiley & Sons, New York, 1979, pages 407-410).

The stability to irreversible gel formation to give silica gel, which is based on three-dimensional crosslinking with formation of Si—O—Si bonds between the particles, decreases with increasing silica content, increasing eletrolyte contamination and decreasing particle size. In general, finely divided silica sols, for example those having particle sizes of less than 6 nm, can be brought only to lower solids concentrations of, for example, <20% by weight compared with coarse-particled silica sols having particle sizes greater than 50 nm, in which solids contents up to 60% by weight can be achieved. An increase in the stability of finely divided silica sols is achieved by carrying out a surface modification with aluminum ions, as described in "The Chemistry of Silica by Iler, John Wiley 1978, pages 407-410".

However, this surface modification is generally carried out after the preparation of the silica sol so that an additional operation is necessary. Moreover, a high aluminum content is undesired in some applications.

SUMMARY OF THE INVENTION

It is an object of the present invention to provide silica sols, in particular those having a large specific surface area, which are distinguished by high stability without modification with aluminum ions being necessary and which in particular can be used in paper retention.

Surprisingly, it has now been found that a stable, partly aggregated, finely divided silica sol is obtained if guanidine carbonate is added in the preparation process.

The invention therefore relates to a process for the preparation of a silica sol, in which a fresh sol is reacted with guanidine carbonate.

DETAILED DESCRIPTION OF THE INVENTION

Figure 1:
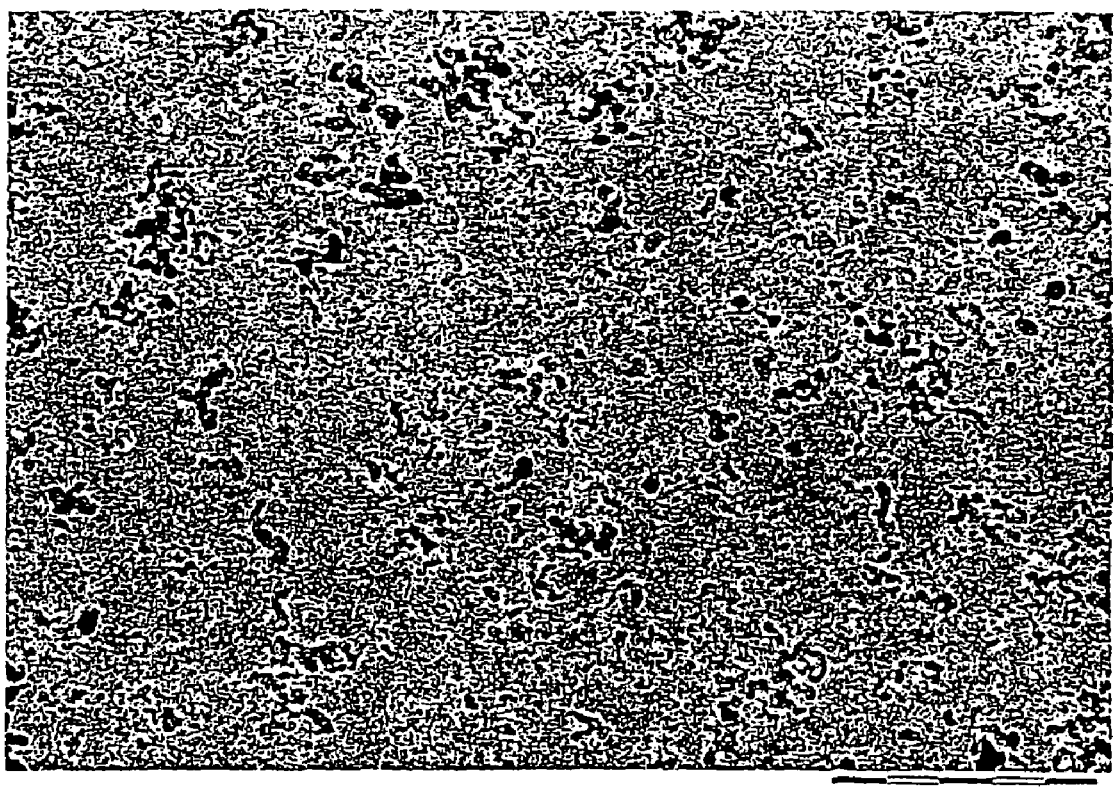
FIG. 1 is a representative transmission electron micrograph of a silica gel according to the present invention.

By an exact reaction procedure, pH control and temperature control or by specific adjustment of the residence times, a desired BET surface area can be established in the product.

The process permits the preparation of a stabilized silica sol having a BET surface area of from 100 to 1200 m$^2$/g and a solids concentration of, for example, from 0.05 to 15% by weight.

In the reaction according to the invention, fresh sol is used. This is an alkali-free $SiO_2$ solution which is produced, for example, by removing the alkali metal cations from a water glass. The commonest method of dealkalization is treatment of dilute water glass solutions with cation exchange resins in the H$^+$ form. Suitable ion exchange resins are, for example, Lewatit® grades from Bayer AG. Preferably, water glass solutions having a silica content of less than 10% by weight are passed over ion exchange columns containing the acidic ion exchangers. Short residence times in the ion exchange zone, in which the pH of the solutions is preferably from 5 to 7, are important for avoiding gelling of the solutions and silicification of the ion exchange resin. The preparation of these small-particled, acidic fresh sols is disclosed, for example, in U.S. Pat. No. 2,244,325 and U.S. Pat. No. 3,468,813. In order to increase the shelf life, i.e. the period of storability of the acidic fresh sol, cooling in the fresh sol to temperatures of 0-15° C., preferably of 4-10° C., should advantageously be used.

The fresh sol to be used according to the invention is preferably an aqueous system having an $SiO_2$ content of from 4 to 8% by weight, preferably from 5 to 7% by weight. As a rule, fresh sols which contain $SiO_2$ particles having a mean particle diameter, determined by means of an ultracentrifuge, of <5 nm are used. The fresh sols used preferably have a pH of from 2 to 4, particularly preferably from 2 to 3.

Unless otherwise characterized, the stated pH values are to be understood as meaning pH values which are determined at 25° C.

According to the invention, fresh sol is reacted with guanidine carbonate. The guanidine carbonate is preferably used in the form of an aqueous solution. The guanidine carbonate concentration of the aqueous solution is preferably from 5 to 30% by weight.

Fresh sol and guanidine carbonate are preferably reacted with one another in amounts such that the weight ratio of $SiO_2$ to guanidine carbonate is from 150 to 0.2, particularly preferably from 60 to 15.

Preferably, the reaction is carried out at a pH of from 8 to 12, measured at the reaction temperature. Particularly preferably, the pH during the reaction is from 8 to 10, measured at the reaction temperature, very particularly preferably from 8.5 to 9.5, measured at the reaction temperature.

The reaction is carried out, for example, at a temperature of from 25° C. to 100° C., preferably from 50° C. to 100° C., particularly preferably from 80° C. to 100° C.

The reaction according to the invention of fresh sol with guanidine carbonate can be carried out in the presence of a further base. This ensures that a defined pH is maintained and gelling is avoided. The base used may be, for example, potassium water glass, sodium water glass, potassium hydroxide and/or sodium hydroxide. The base used is preferably sodium water glass. Commercial sodium water glass has a composition of $Na_2O$ 3.34 SiO2 and is usually prepared by melting quartz sand with sodium carbonate or a mixture of sodium sulfate and carbon, a transparent colorless glass being obtained, so-called piece glass. This piece glass reacts in ground form with water at elevated temperature and pressure to give colloidal, strongly alkaline solutions, which are subsequently subjected to a purification. Processes in which finely divided quartz or other suitable $SiO_2$ raw materials are digested under hydrothermal conditions with alkalis directly to give aqueous water glasses are also known.

The base is preferably added in a molar ratio of $SiO_2$ to $Na_2O$ of from 80 to 20, particularly preferably from 60 to 30.

The base can be metered, for example in the form of an aqueous solution, to the reactor in which the reaction of fresh sol and guanidine carbonate is carried out. It is also possible to add the base completely or partly directly to a solution of guanidine carbonate and then to react this mixture with the fresh sol. The second procedure is preferred.

The process according to the invention can be carried out continuously or batchwise. A continuous procedure is preferred.

In the continuous reaction procedure, preferably the fresh sol and an aqueous solution of guanidine carbonate are fed continuously to a reactor, a pH of from 8 to 12, measured at the reaction temperature, and a temperature of from 25° C. to 100° C. being established and the average residence time being chosen so that the silica sol prepared has a BET surface area of $\geq 100$ m$^2$/g.

Specific surface areas can be determined either by the BET method (S. Brunauer, P. H. Emmet and E. Teller, J. Am. Soc., 1938, 60, page 309) on dried $SiO_2$ powder or directly in solution by titration according to G. W. Sears (Analytical Chemistry, Vol. 28, page 1981, year 1956). Unless stated otherwise, values for the specific surface area which were determined by the BET method are given in the present description.

The reaction is preferably carried out at a temperature of from 50° C. to 100° C., particularly preferably from 80° C. to 100° C.

The residence time is substantially determined by the reaction volume and the feed and discharge streams. Preferably, from 1.0 to 6.5 l/h of fresh sol and from 0.1 to 0.5 l/h of an aqueous solution of guanidine, carbonate or of an aqueous alkaline guanidine carbonate solution are added to a reactor having a reaction volume of from 0.5 to 1.0 liter. The discharge stream can be influenced in particular by evaporating a certain amount of water during the reaction, the amount of evaporated water being established by the choice of the temperature.

The process according to the invention is preferably carried out in a multistage reactor cascade, in particular in a reactor cascade comprising three reaction vessels connected in series.

Here, all starting materials are preferably fed to the first reaction vessel. However, it is also conceivable to pass part-streams of the starting materials into the second or a further reaction vessel. What is important, however, is that at least part of the silica sol and also of guanidine carbonate is fed to the first reaction vessel.

The reaction procedure in a multistage reactor cascade makes it possible to create spatially separated steady states with respect to pH, temperature, mean particle diameter, $Na_2O$ content and $SiO_2$ concentrations, and residence time. Of particular importance is the residence time in those reactors to which fresh sol is added since it is there that the growth process to give larger particles preferentially takes place. The average residence time is preferably controlled by an evaporated amount of water or amount of water to be evaporated and by the fresh sol addition to the respective reactors, concentration simultaneously taking place as a result of the evaporation of water. The BET surface area of the silica sol obtained is determined substantially by the temperature and the residence time in the reaction vessel into which the starting materials are passed.

The apparatus used in the process according to the invention preferably consists of a plurality of overflow reactors arranged in series and connected to one another, at least two of said reactors. The content of each reaction vessel is thoroughly mixed. Defined amounts of distillate are removed from the reactors by suitable heat sources. The addition of the starting materials fresh sol, guanidine carbonate and optionally base to the reactors, at least to the first reactor in the direction of material flow, is effected by metering means.

When the process according to the invention is carried out in a reactor cascade, it should be ensured that a pH of from 8 to 12, measured at the reaction temperature, is established in all reaction vessels and the temperature in the first reactor is from 25° C. to 100° C. The temperature in the further reactors is preferably from 60° C. to 100° C.

If a temperature of about the boiling point of the solvent used, preferably water, is established in one or more of the reaction vessels, evaporation of solvent occurs. In this way, the concentration of $SiO_2$ in the product can be increased. This process is referred to as concentration.

When the reactor cascade is started up, the steady states with respect to pH, temperature and average residence time described above and characteristic for the invention must be established. For starting up, it is not necessary to fill all reactors of the multistage apparatus with suitable initially introduced materials. It is sufficient to have or to produce a suitable initially introduced material in the first reactor. A suitable initially introduced material is, for example, an aqueous, alkaline colloidal silica sol solution having a pH of >8, an aqueous, alkaline colloidal silica solution which contains from 0.1 to 10% by weight of guanidine carbonate and has a pH of >8 or an aqueous, alkaline guanidine carbonate solution which contains from 0.1 to 10% by weight of guanidine carbonate.

Although a continuous procedure is preferred, a batchwise procedure is also possible. For example, at least a part of the fresh sol and of an aqueous solution of guanidine carbonate is initially introduced into a reactor and the remainder of the fresh sol and the aqueous solution of guanidine carbonate is metered into the reaction mixture, the temperature being adjusted so that an amount of solvent which corresponds to the amount of metered fresh sol and the aqueous solution of guanidine carbonate evaporates.

As already mentioned above, the concentration of $SiO_2$ can be increased during the preparation itself by evaporating a part of the solvent. However, the actual preparation process can also be followed by a separate process for concentration. The concentration in turn can be effected, for example, thermally by evaporating down or by ultrafiltration through membranes. For example, ceramic membranes are suitable for this purpose.

The invention furthermore relates to a silica sol which is obtainable by the process according to the invention.

The invention also relates to a silica sol having a BET surface area of from 100 to 1200 $m^2/g$, the silica sol containing from 0.05 to 15% by weight of guanidinium ions, based on the total weight of the silica sol.

The silica sol of the present invention has a negligibly low aluminum content, preferably less than 50 ppm. Nevertheless, it is distinguished by a high stability in combination with a large BET surface area, it being possible to establish solids contents of the silica sol of up to 15% by weight of $SiO_2$.

The concentration of $SiO_2$ in the silica sol according to the invention is preferably from 3 to 15% by weight, based on the total weight of the silica sol.

The silica sol preferably contains from 0.1 to 15% by weight of guanidinium ions, particularly preferably from 0.5 to 10% by weight.

The silica sol preferably has a BET surface area of from 300 to 1200 $m^2/g$, particularly preferably from 500 to 1000 $m^2/g$, very particularly preferably from 700 to 1000 $m^2/g$.

In a particular embodiment the silica sol has a BET surface area of from 400 to 650 $m^2/g$.

The $SiO_2$ particles of the silica sols according to the invention preferably have particle sizes with a broad size distribution of 3-300 nm. In addition to electron micrographs, other different methods, such as, for example, laser correlation spectroscopy, photon correlation spectroscopy, ultrasonic measurements or measurements using an ultracentrifuge (sedimentation), are suitable for the measurement of particle sizes in the nanometer range. Owing to its high separating efficiency, the ultracentrifuge is particularly suitable for determining particle size distributions.

The particular feature of this method of measurement is that a fractionation of the dispersion by particle size is effected before the actual measurement. In a homogeneous dispersion, it is known that the large particles settle out more rapidly than the medium-sized and small particles present. By passing laser light through the ultracentrifuge cell, a pronounced change of intensity occurs as a function of time. From this change of intensity, it is possible to calculate the change of concentration of the particles and from this the particle size distribution.

The particle sizes of the $SiO_2$ particles of the silica sols according to the invention are therefore determined by means of an ultracentrifuge.

The mean diameter of the $SiO_2$ particles of the silica sols according to the invention is preferably from 3 to 30 nm, this value likewise being determined by means of a commercial ultracentrifuge.

The silica sol according to the invention preferably has a pH of from 2 to 12, the pH particularly preferably being from 8 to 11. The range from pH 5 to pH 6 is less preferred since silica sols in this range have only low stability. At pH values above 12, peptization and dissolution of the particles with formation of alkali metal silicate solution then increasingly occurred.

The finely divided silica sols according to the invention are as a rule partly aggregated, i.e. individual spherical $SiO_2$ particles have agglomerated and form irregular structures, it being possible for the spherical $SiO_2$ particle to be arranged both in a chain-like manner and in three dimensions.

In a particular embodiment, the silica sols according to the invention are free of amines.

FIG. 1 shows a transmission electron micrograph of a silica sol according to the invention. The magnification is 200000:1. The partial aggregation is clearly evident.

The silica sols according to the invention usually have a viscosity of less than 10 mPa s at a solids content of 10% by weight. The stated viscosity is determined by means of a Höppler viscometer at a temperature of 20° C. The viscosity is preferably from 1.8 to 2.2 mPa s at a solids content of 10% by weight. The viscosity of the silica sols depends in particular on the silica content, the particle size of the silica particles, the degree of crosslinking of the particles and the electrolyte content.

The silica sol according to the invention has a molar $SiO_2/N$ ratio of from 2 to 20, preferably from 4 to 12. The determination of the $SiO_2/N$ ratio is effected by means of a customary elemental analysis.

Virtually all particles in contact with a liquid have a charge on their surface. The zeta potential is an important and useful indicator of the surface charge, which indicator can be used for predicting and monitoring the stability of a colloidal suspension or emulsion ("Zeta Potential A New Approach" by B. B. Weiner, W. W. Tscharnuter and D. Fairhurst, company brochure of Brookhaven Instruments). The larger the zeta potential, the greater is the probability that the suspension will remain stable, since the charged particles repel one another and therefore do not agglomerate. The zeta potential can therefore be used for monitoring the stability of a colloidal suspension. The higher the zeta potential of a silica sol the higher therefore is the stability of the sol. Colloidal suspensions having good stability have a zeta potential between −30 and −60 mV. Colloidal suspensions having very good to extreme stabilities have zeta potentials of from −60 to −100 mV. At zeta potentials below −15 mV, the sol is unstable.

In preferred embodiments, the silica sol according to the invention has has a zeta potential of from −20 to −80 mV, preferably from −30 to −60 mV.

The zeta potential is determined using a Brookhaven Zeta PALS.

Information about the structure can be obtained from IR band positions of silica sols. In particular, the position of the Si—O stretching vibration band ($v_{Si-O}$) may be of interest. In preferred embodiments, the silica sol according to the invention therefore has a band position of Si—O stretching vibration at a wave number of from 1113 $cm^{-1}$ to 1080 $cm^{-1}$ preferably from 1113 $cm^{-1}$ to 1100 $cm^{-1}$, particularly preferably from 1112 $cm^{-1}$ to 1104 $cm^{-1}$. In addition to the Si—O stretching vibration band described above, the silica sol according to the invention has, owing to the content of guanidinium ions, an N—H deformation vibration band ($\delta_{N-H}$) at a wave number in the range from 1750 to 1640 $cm^{-1}$. The IR spectra are measured using a Digilab FTS 4000 Fourier transformation infrared spectrometer. Sufficiently precise band positions and band shapes are obtained under the following recording conditions: spectral resolution: 1 $cm^{-1}$, apodization: box car, zerofilling factor: at least 2, number of scans: 32. According to DIN specification 55350, Part 13 the measurements are carried out six times, and a relative standard deviation of less than 0.1% should preferably be achieved. The samples are prepared as KBr pellets. It should be ensured that the spectra do not have an ascending baseline (Christiansen effect due to scattering by small particles) but have maximum extinctions in the range from 0.7 to 1.3 A. The stated wave number relates to the maximum of the relevant band (absorption maximum). The IR band position of the silica sols according to the invention differs from silica sols not according to the invention firstly in the position of the Si—O stretching vibration band and secondly in the N—H deformation vibration band of the guanidinium ions, owing to the absence of guanidinium ions in the case of silica sols not according to the invention.

Figure 2:
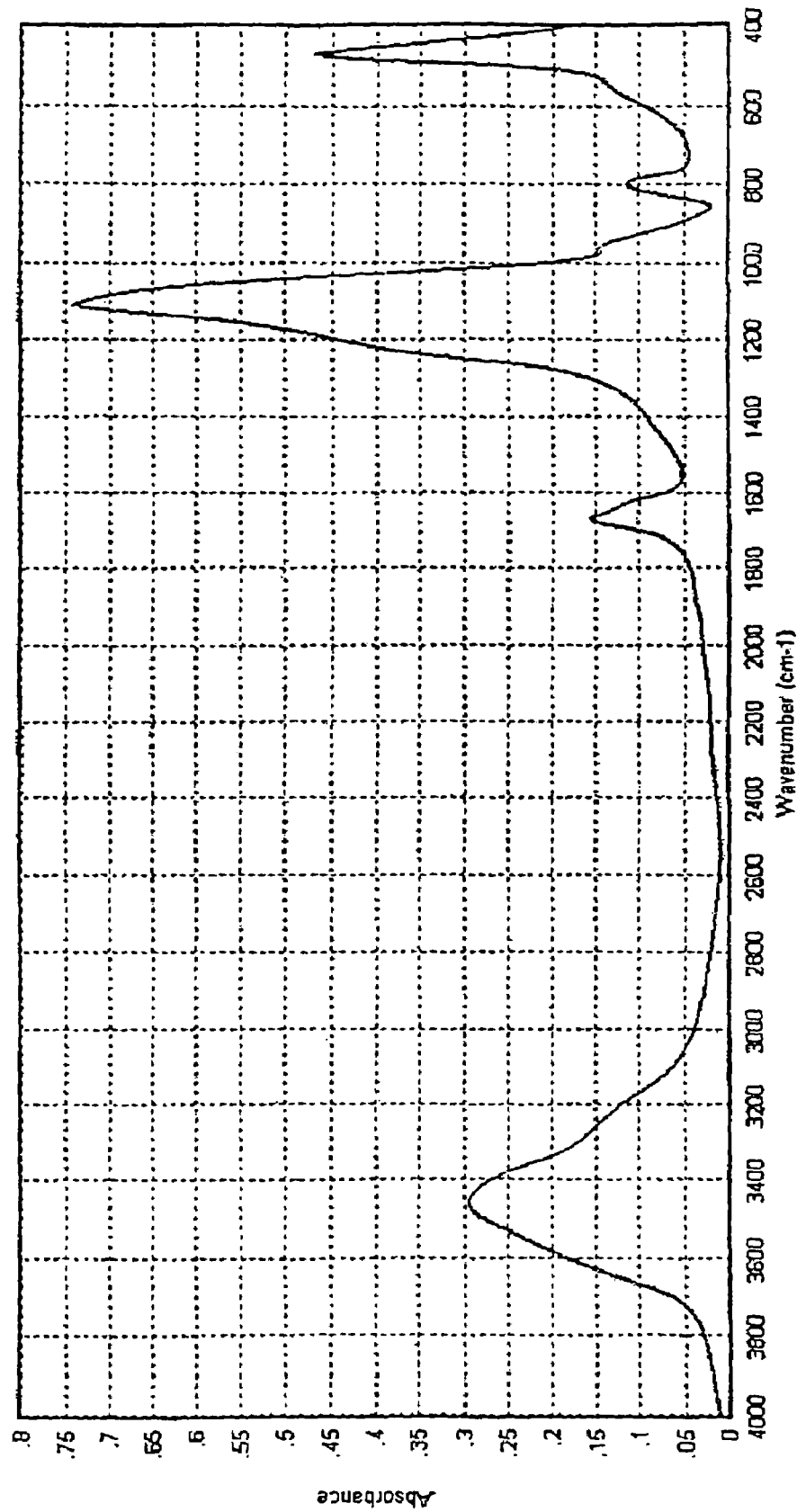
FIG. 2 is a graphical representation of an IR spectrum of a silica gel according to the present invention.

FIG. 2 shows an IR spectrum of a silica sol according to the invention.

Figure 3:
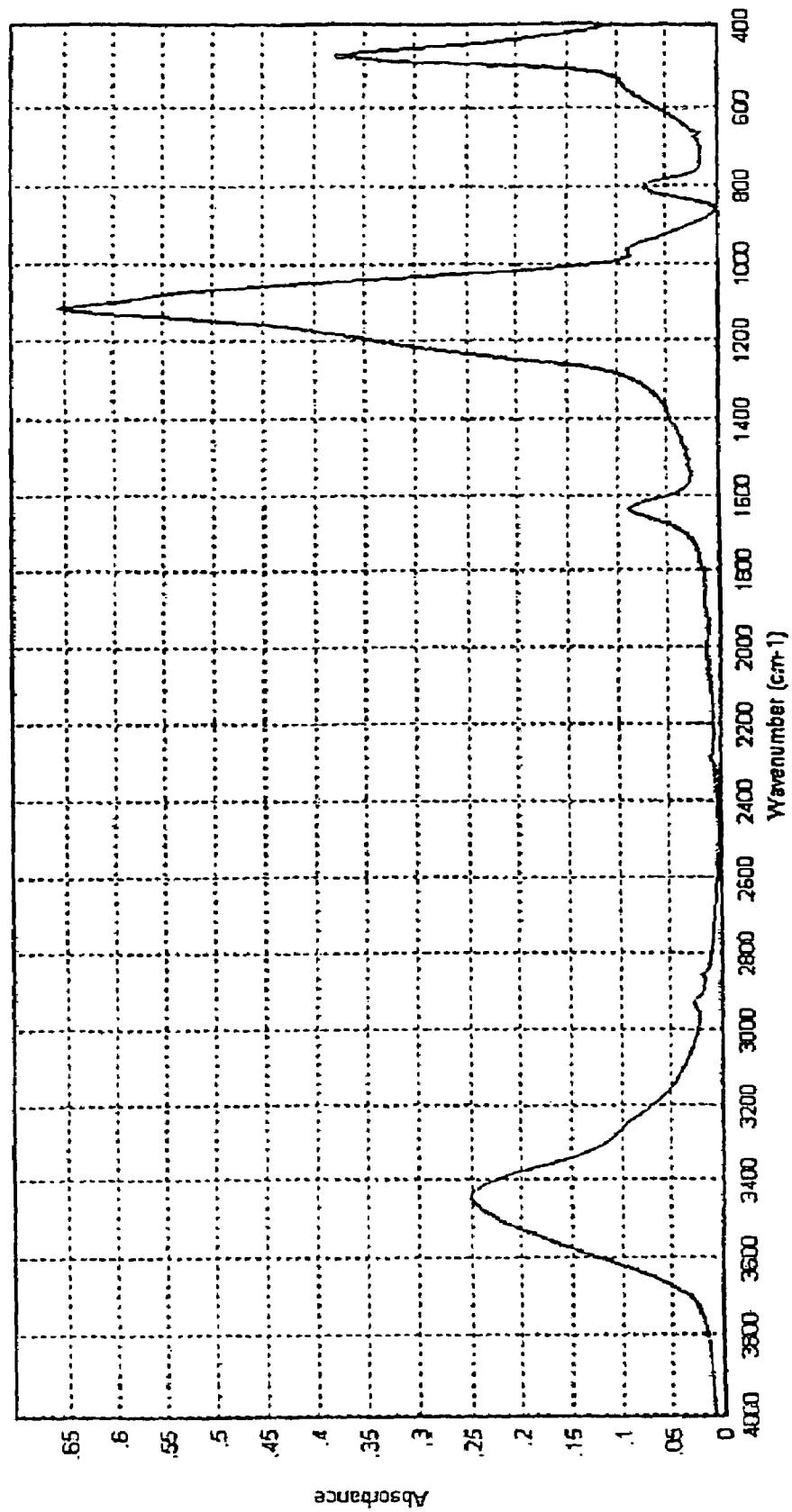
FIG. 3 is a graphical representation of an IR spectrum of a comparative silica gel.

FIG. 3 shows an IR spectrum of a silica sol not according to the invention.

Silica sols are generally unstable to electrolyte addition, such as, for example, addition of sodium chloride, ammonium chloride and potassium fluoride. Preferably, the silica sols according to the invention therefore contain no added electrolyte.

The silica sols according to the invention are suitable for a number of applications. For example, the use as binder for precision casting, in the refractories sector, in the preparation of catalysts, as coating agents, in the textile sector, in the paper sector, for antislip finishes, in the construction sector and as polish for electronics may be mentioned.

The silica sols according to the invention can be particularly advantageously used in paper retention. For this purpose, the silica sols are used, as a rule, as a mixture with cationic polymers. Cationic polymers which may be used are all polymers which are usually used as retention aids and/or wet strength agents in papermaking. Both natural polymers, for example based on carbohydrates, and synthetic polymers are suitable. Cationic starch and cationic polyacrylamides, polyethylenimines, polyamidoamines and poly(diallyldimethylammonium chloride) may be mentioned by way of example. Preferred cationic polymers are cationic starch and cationic polyacrylamides.

The amount of silica sol according to the invention and cationic polymer which are used in papermaking can vary within a wide range and are dependent, inter alia, on the type of paper raw material, the presence of fillers and other conditions.

The amount of silica sol used should as a rule be at least 0.01 kg of silica sol, calculated as $SiO_2$, per metric ton of dry fibers and optionally fillers. Preferably, from 0.1 to 2 kg of silica sol, calculated as $SiO_2$, are used per metric ton of dry fibers and optionally fillers.

The addition of the silica sol and of the cationic polymer in papermaking is effected by the customary procedure and is described, for example, in U.S. Pat. No. 5,643,414.

The invention is further explained below with reference to examples, but these are not to be understood as imposing any restriction.

EXAMPLE 1

An apparatus which consists of three glass overflow reactors arranged in series and connected to one another was used.

The content of each reaction vessel is thoroughly mixed with a propeller stirrer. The reactor content is heated indirectly by means of steam. For this purpose, heating coils through which steam flows are mounted in the interior of the reaction vessel. The vapors are passed over a water condenser and are condensed and the volume of the condensate is then measured.

In the first of the three overflow reactors, an aqueous solution of acidic fresh sol, prepared according to U.S. Pat. No. 2,244,325, was added by means of a feed apparatus. The feed apparatus was chosen so that the addition could also be effected into individual, selected reactors. The addition of the guanidine carbonate solution and optionally of a solution of a further base was likewise possible by means of a metering apparatus.

In order to increase the shelf life, i.e. the duration of storability of fresh sol, said solution was cooled to temperatures of 4-10° C.

The alkaline guanidine carbonate solution was not cooled and was used at ambient temperature. Guanidine carbonate from Agrolinz was used.

A steady state was established in the three reaction vessels, with an average residence time of 14 min in the 1st reaction vessel, 16 min in the 2nd reaction vessel and 20 min in the 3rd reaction vessel. For this purpose, 3200 ml of fresh sol containing 5.6% by weight of $SiO_2$ per hour were added to the first reaction vessel and 260 ml of alkaline guanidine carbonate solution per hour were added likewise to the 1st reaction vessel and 1160 ml of water were evaporated in the downstream reaction vessels.

The alkaline guanidine carbonate solution contained 47.7 g of guanidine carbonate and 9.3 g of aqueous NaOH solution (45% strength by weight) per 945 ml of water.

During the steady state, 91° C. was established in the 1st reaction vessel, 100° C. in the 2nd reaction vessel and likewise 100° C. in the 3rd reaction vessel. The $SiO_2$ concentration changes from 5.6% by weight in the 1st reaction vessel to 9.5% by weight in the 3rd reaction vessel during the steady state.

A finely divided, partly structured silica sol which had a density of 1.065 g/ml, a pH of 9.7 and a BET surface area of 480 $m^2/g$ was obtained.

EXAMPLE 2

A steady state was established in the apparatus described in example 1, with an average residence time of 14 min in the 1st reaction vessel, 16 min in the 2nd reaction vessel and 20 min in the 3rd reaction vessel, by adding 1600 ml of fresh sol containing 5.6% by weight of $SiO_2$ per hour to the first reaction vessel and 128 ml of alkaline guanidine carbonate solution per hour likewise to the 1st reaction vessel and by evaporating 390 ml of water. The alkaline guanidine carbonate solution contained 45.7 g of guanidine carbonate and 8.4 g of KOH per 945 ml of water.

During the steady state, 85° C. was established in the 1st reaction vessel, 100° C. in the 2nd reaction vessel and likewise 100° C. in the 3rd reaction vessel. The $SiO_2$ concentration changed from 5.6% by weight in the 1st reaction vessel to 6.1% by weight in the 2nd reaction vessel.

After an operating time of 3 hours in the steady state, a silica sol containing 6.1% by weight of $SiO_2$ and having a pH of 8.71 and a BET surface area of 698 $m^2/g$ was obtained in the discharge.

EXAMPLE 3

In this example, an aqueous guanidine carbonate solution which contained no additional base was used.

The reaction was carried out in the apparatus described in example 1. A steady state was established, with an average residence time of 14 min in the 1st reaction vessel, 16 min in the 2nd reaction vessel and 20 min in the 3rd reaction vessel. For this purpose, 1600 ml of fresh sol containing 5.6% by weight of $SiO_2$ per hour and 128 ml of aqueous guanidine carbonate solution per hour were added to the 1st reaction vessel and 1160 ml of water were evaporated in the downstream reaction vessels.

The aqueous guanidine carbonate solution contained 50 g of guanidine carbonate per 950 g of water.

During the steady state, 87° C. was established in the 1st reaction vessel, 100° C. in the 2nd reaction vessel and likewise 100° C. in the 3rd reaction vessel. The $SiO_2$ concentration changed from 5.6% by weight in the 1st reaction vessel to 5.8% by weight in the 2nd reaction vessel.

A finely divided, partly structured silica sol which had a density of 1.031 g/ml, a pH of 8.46 and a BET surface area of 558 $m^2/g$ was obtained.

EXAMPLE 4

1 liter of demineralized water was initially introduced into a stirred apparatus comprising a 2 l three-necked flask and heated to 80° C. 3200 ml of acidic fresh sol (5.6% by weight of $SiO_2$) and 256 ml of an alkaline guanidine carbonate solution were then metered in per hour. The alkaline guanidine carbonate solution contained 47.5 g of guanidine carbonate and 9.3 g of aqueous solution of sodium hydroxide (45% strength by weight) per 925 g of demineralized water. 3456 ml of reaction solution were pumped off per hour with a pump. The average residence time was 17 minutes.

The silica sol obtained had an $SiO_2$ content of 5.7% by weight, a BET surface area of 541 $m^2/g$ and a pH of 8.7.

EXAMPLE 5

This example shows that the silica sol according to the invention can be prepared in a batch process.

3 liters of a mixture which were obtained by mixing 5064 g of fresh sol, 3836 g of water, 171.5 g of solid guanidine carbonate and 90.2 g of sodium water glass from Cognis were initially introduced into a stirred apparatus comprising a 6 l three-necked flask. The mixture was heated to 80° C. Thereafter, 168 ml/h of the mixture described were metered in and at the same time 168 ml/h of condensate were removed from the reaction mixture. The acidic fresh sol (5.6% by weight of $SiO_2$) was prepared as described in U.S. Pat. No. 2,244,325.

After 36 hours, a partly aggregated silica sol which had an $SiO_2$ content of 12.35% by weight, a BET surface area of 300 $m^2/g$ and a pH of 10.4 was obtained.

An IR spectrum of the silica sol according to the invention (KBr pellet) was recorded (FIG. 2). A wave number of 1107 $cm^{-1}$ was determined for the position of the Si—O stretching vibration band on the basis of precision measurement according to DIN 55350 (6 measurements).

For comparison, an IR spectrum of a silica sol not according to the invention (KBr pellet), which contains no guanidinium ions, was recorded (FIG. 3), and a wave number of 1.114 $cm^{-1}$ was determined for the position of the Si—O stretching vibration band, likewise on the basis of precision measurement according to DIN 55350 (6 measurements).

The results of the precision measurement are the following:

| Measurement No.: | Silica sol not according to the invention (without guanidinium ions) | Silica sol according to the invention (containing guanidinium ions) |
|---|---|---|
| 1 | 1114 | 1105 |
| 2 | 1116 | 1107 |
| 3 | 1114 | 1107 |
| 4 | 1114 | 1107 |
| 5 | 1115 | 1107 |
| 6 | 1114 | 1106 |

The silica sol not according to the invention was prepared as follows:

11, 72 g of 45% strength sodium hydroxide solution and 250 g of demineralized water were initially introduced at 80°

C. into a stirred apparatus comprising a 6 l three-necked flask. 3000 g of fresh sol comprising 5.6% by weight of $SiO_2$ (prepared as described in U.S. Pat. No. 2,244,325) are then added in the course of 5 min via a dropping funnel with stirring. The $SiO_2/Na_2O$ ratio corresponded to 44. The temperature decreases to 40° C. during this procedure. The mixture was heated to 60° C. and thermostated for 30 min and then heated to boiling point and concentrated at atmospheric pressure to an $SiO_2$ solids content of 9.5% by weight. The silica sol had a BET surface area of 535 $m^2/g$ and a pH of 10.06.

The invention claimed is:

1. A process for the preparation of a silica sol comprising reacting a fresh sol with guanidine carbonate, wherein the fresh sol comprises an aqueous system having an $SiO_2$ content of 4 to 8% by weight and a pH of 2 to 4, wherein the prepared silica sol has a BET surface area of 100 to 1200 $m^2/g$, comprises from 0.05 to 15% by weight of guanidinium ions, based on the total weight of the prepared silica sol, and wherein the prepared silica sol is free of amine.

2. The process of claim 1, wherein the reaction with guanidine carbonate is conducted in the presence of a base.

3. The process of claim 2, wherein the base is selected from the group consisting of sodium water glass, potassium water glass, potassium hydroxide, sodium hydroxide and combinations thereof.

4. The process of claim 2, wherein the reaction is carried out at a reaction temperature and at a pH of from 8 to 12, the pH being measured at the reaction temperature.

5. The process of claim 1, wherein said process is conducted continuously.

6. The process of claim 2, wherein the fresh sol and an aqueous solution of guanidine carbonate are fed continuously into a reactor, said reaction being conducted at,
   a pH of from 8 to 12, and
   a reaction temperature of from 25C to 100C, further wherein an average residence time is selected such that the silica sol prepared has a BET surface area of ≧100 $m^2/g$.

7. The process of claim 6, wherein said reaction temperature is from 80to 100C.

8. The process of claim 6, wherein an additional base is added into the reactor.

9. The process of claim 6, wherein the reactor is a multistage reactor cascade having a first reactor, said fresh sol and an aqueous solution of guanidine carbonate being fed to the first reactor.

10. The process of claim 9, wherein the pH, measured at the reaction temperature, is from 8 to 12 in all reactors of the multistage reactor cascade, and the reaction temperature in the first reactor is kept at from 25C to 100C, and the reaction temperature in each further reactor is kept at from 60C to 100 C.

11. The process of claim 1, wherein the reaction is conducted batchwise, the guanidine carbonate being in the form of an aqueous solution of guanidine carbonate, said process comprising,
   introducing initially a part of the fresh sol and the aqueous solution of guanidine carbonate into a reactor, resulting in the formation of a remainder comprising said fresh sol and said aqueous solution of guanidine carbonate, said remainder not being initially introduced into said reactor, and
   metering subsequently said remainder into the reactor, and the holding said reactor at a temperature such that an amount of solvent which corresponds to the amount of said remainder evaporates from said reactor, thereby concentrating said silica sol.

12. The process of claim 1, further comprising concentrating said silica sol by a method selected from the group consisting of evaporation of solvent and by ultrafiltration, wherein the concentration step is conducted during or after the reaction of fresh sol with guanidine carbonate.

13. The process as claimed in claim 1, wherein said silica sol is not stabilized with aluminum and is free of amine.

* * * * *